United States Patent
Klepper et al.

(10) Patent No.: US 9,547,414 B2
(45) Date of Patent: Jan. 17, 2017

(54) OPERATING DEVICE FOR OPERATING AT LEAST ONE ELECTRIC DEVICE

(75) Inventors: Martin Klepper, Aicha (DE); Mathias Krause, Brigachtal (DE)

(73) Assignee: Robert Bosch GmbH, Stuttgart (DE)

( * ) Notice: Subject to any disclaimer, the term of this patent is extended or adjusted under 35 U.S.C. 154(b) by 215 days.

(21) Appl. No.: 13/882,368

(22) PCT Filed: Sep. 1, 2011

(86) PCT No.: PCT/EP2011/065077
§ 371 (c)(1),
(2), (4) Date: Apr. 29, 2013

(87) PCT Pub. No.: WO2012/055613
PCT Pub. Date: May 3, 2012

(65) Prior Publication Data
US 2013/0219336 A1  Aug. 22, 2013

(30) Foreign Application Priority Data
Oct. 29, 2010 (DE) .......... 10 2010 043 104

(51) Int. Cl.
*G06F 3/0481* (2013.01)
*G06F 3/0484* (2013.01)
*G06F 3/0488* (2013.01)

(52) U.S. Cl.
CPC ......... *G06F 3/04817* (2013.01); *G06F 3/0488* (2013.01); *G06F 3/04847* (2013.01)

(58) Field of Classification Search
CPC ............... G06F 3/044–3/045; G06F 3/04886; G06F 3/0488; G06F 3/0481–3/0482
USPC ......... 715/810, 764, 771, 773, 779; 345/173
See application file for complete search history.

(56) References Cited

U.S. PATENT DOCUMENTS

| 2005/0276448 | A1  | 12/2005 | Pryor |
| 2006/0210098 | A1* | 9/2006 | Okabayashi ........... H04H 60/04 381/119 |
| 2007/0052687 | A1* | 3/2007 | Terada ................ G06F 3/04847 345/173 |
| 2009/0085880 | A1  | 4/2009 | Vitale et al. |

FOREIGN PATENT DOCUMENTS

| CN | 1835070 | 9/2006 |
| CN | 101692693 | 4/2010 |
| DE | 10050223 | 4/2002 |
| DE | 102006000637 | 7/2007 |

(Continued)

OTHER PUBLICATIONS

International Search Report for Application No. PCT/EP2011/065077 dated Nov. 7, 2011 (3 pages).

*Primary Examiner* — Amy Ng
*Assistant Examiner* — Roland Casillas
(74) *Attorney, Agent, or Firm* — Michael Best & Friedrich LLP

(57) ABSTRACT

The invention relates to an operating device (1) for operating at least one electric device (2) that has one, two, or more functional parameter(s) (3), said operating device (1) comprising a touchscreen (4) and a mechanical operating element (5). The operating device (1) is designed to assign control over the functional parameter(s) (3) to the mechanical operating element (5) by means of a selection on the touchscreen (4).

8 Claims, 5 Drawing Sheets

(56) References Cited

FOREIGN PATENT DOCUMENTS

| | | | |
|---|---|---|---|
| DE | 102008016017 | 10/2009 | |
| EP | 1703652 | 9/2006 | |
| GB | 2116796 | 9/1983 | |
| JP | EP 2437516 A1 * | 4/2012 | ......... G06F 3/04847 |

* cited by examiner

OPERATING DEVICE FOR OPERATING AT LEAST ONE ELECTRIC DEVICE

BACKGROUND OF THE INVENTION

The invention relates to an operating device for operating at least one electric device that has one, two or more functional parameters, said operating device comprising a touchscreen and a mechanical operating element.

Operating devices for electric devices are known for numerous applications, for example for the operation of devices in motor vehicles or for audio applications. In motor vehicles, particularly different functional parameters of a radio unit, air conditioning system and/or a navigation device can be actuated and controlled by means of the operating device. The functional parameters of the air conditioning system include, for example, the temperature and the fan speed. With regard to the audio applications, functional parameters such as, for example, values of treble and bass and the dynamics of one or a plurality of instruments can be adjusted on so-called mixing consoles.

The German patent publication DE 10 2006 000 637 A1, which probably constitutes the prior art closest to the invention, describes a display device which has a contactless, sensitive surface. Because the display device allows for a capacitive as well as resistive interpretability, said device is designed to operate one or a plurality of electric devices by contact with or approach to symbols which are displayed on the surface.

SUMMARY OF THE INVENTION

Embodiments of the invention include an operating device, a mixing console as well as a method for operating the operating device. Aspects of the invention will become apparent from the claims, the description below as well as from the attached figures.

Within the scope of the invention, an operating device is proposed which is designed for operating at least one electric device. The operating device and the at least one electric device are preferably connected to one another via electric cables or radio technology. Said operating device is particularly integrated in a mixing console. Mixing consoles are particularly designed to mix individual audio signals together to form a stereo signal or a multichannel signal. Said mixing consoles are, for example, used for the acoustic irradiation of discotheques and concert halls, for radio and television broadcasts and in film and recording studios.

The at least one electric device preferably comprises one, two or more audio signal sources or interfaces for taking over signals from said audio signal sources. The operating device is particularly designed to operate or, for example, merge audio signal sources, such as, e.g., electric sound generators, musical instruments and/or microphones. The at least one electric device has one, two or more functional parameters, in particular adjustable variables and/or values, such as, e.g., treble, bass, volume, dynamics, frequency response, etc.

The operating device comprises a touchscreen and a mechanical operating element. In a simple embodiment, the touchscreen is preferably designed to detect and process a single touch point on said touchscreen. In a preferred embodiment, the touchscreen is designed as a multi-touchscreen for the simultaneous detection and processing of a plurality of touch points.

The touchscreen is particularly designed for the display of at least one symbol, in particular characters, numbers and/or pictures. The at least one symbol preferably represents the functional parameter(s) and/or defines the same. Said functional parameter(s) have particularly one or two states, e.g. on or off. The functional parameter(s) have alternatively or additionally a variable value from a value set. The at least one symbol preferably represents the functional parameter(s), in particular a degree of adjustment and/or degree of control of said functional parameter(s), as a switch, push button or controller having a switch setting, push button setting or controller setting corresponding to the degree of adjustment and/or degree of control. It is likewise conceivable for the symbol to alternatively or additionally symbolize the at least one electric device.

The touchscreen is preferably designed as a non-touch sensitive screen and/or as a touch-sensitive screen. In so doing, the touchscreen comprises, for example, at least one capacitive sensor means, which is designed to detect a contactless approach to the at least one displayed symbol. Alternatively or additionally the touchscreen comprises at least one resistive sensor means which is designed to detect contact with the displayed symbol.

The mechanical operating element is preferably designed as a mechanical controller for setting and/or controlling the functional parameter(s). It is conceivable within the scope of the invention for the touchscreen and the mechanical operating element to be disposed together, for example contiguously or side by side, on the mixing console.

According to the invention, the operating device is designed to assign control, in particular adjustment, closed-loop and/or open-loop control, over the functional parameter(s) to the mechanical operating element by means of a selection on the touchscreen. The selection can particularly occur by means of the contactless approach to and/or contact with the symbol(s) on the touchscreen. The operating device is preferably designed for the purpose of assigning adjustment, open-loop and/or closed-loop control over the functional parameters to the mechanical operating element.

To this end, the operating device preferably comprises and evaluation and control unit, the evaluator being thereby designed to evaluate the selection of the symbol(s), the assignment of the functional parameter(s) by the touchscreen and the setting, open-loop control and/or closed-loop control of said parameter(s) by the operating element. The controller is particularly designed to actuate the at least one electric device in accordance with the setting, open-loop control and/or closed-loop control of said parameter(s).

Advantages of conventional touchscreens known from the prior art ensue from the fact that they are designed to optically depict and/or display one or more functional parameters by means of one or more symbols virtually as a switch setting, push button setting and/or control setting. The conventional touchscreens are particularly designed to flexibly and dynamically adapt the display to the currently set functional parameters of the at least one electric device. Because no additional input means, for example a keyboard or keypad is generally necessary for the operation of the touchscreen, in particular for the selection of the symbols, a separate or additional input means can be omitted and installation space can be saved. An input of one of the two states, as, for example, on/off, can take place directly via the switch or push button depicted on the conventional touchscreen in a manner which is usually effortless and comfortable for the user.

Nevertheless an exact actuation or operation of the touchscreens known from the prior art is difficult in many cases when a virtual representation and/or display of a controller is used. This is the case because the user does not receive any haptic or mechanical feedback. The degree of adjustment and/or degree of control of the functional parameter(s) can only be correctly assessed by the user to a limited extent. In order to obtain the concretely set or controlled degree, the user is for the most part forced to maintain constant eye contact with the display of the controller on the conventional touchscreen when the functional parameter(s) is/are being set or controlled. A direct, precise and simultaneously fast setting, open-loop and or closed-loop control of the functional parameter(s), in particular without constant eye contact with the touchscreen known from the prior art, can for the most part not be practically implemented.

In contrast, conventional mechanical operating elements known from the prior art offer the advantage that the user receives a haptic or mechanical feedback when interacting with the same, and said feedback can be intuitively and correctly assessed with regard to the setting and/or control of the functional parameter(s) which was/were performed. For example, the experienced user knows for the most part that he/she achieves a slowly moving value change of the functional parameter(s) by applying a small force. On the other hand, a large and/or fast value change results when a larger force is applied.

The invention combines the high degree of variability, dynamics and flexibility of the conventional touchscreens known from the prior art with the advantages of the mechanical operating elements known from the prior art in that different functional parameters displayed on the touchscreen can be assigned in accordance with the invention to the operating element for control purposes.

The user is advantageously in the position to precisely set and/or control the functional parameter(s) by means of the haptic or, respectively, mechanical feedback of the inventive mechanical operating element. Particularly in temporally critical applications, in which a delay during the control of the functional parameter(s) is not admissible, a combination of the high degree of flexibility of the touchscreen and the haptic feedback of the operating element is very advantageous.

On account of the haptic or, respectively, mechanical feedback, it is also very advantageous that the user is not required to maintain any eye contact with the mechanical operating element and/or with the inventive touchscreen when setting the functional parameter(s) and/or controlling said functional parameters in an open-loop and/or closed loop manner. In so doing, a simultaneous observation of other processes can be facilitated in an advantageous manner.

The user can preferably perform a fast, intuitive selection and assignment of the functional parameter(s) on the inventive touchscreen and obtain the haptic or mechanical feedback by operating the inventive mechanical operating element.

In a preferred embodiment of the invention, the touchscreen is designed to display the functional parameter(s), in particular the degree of adjustment and/or degree of control thereof, by means of a symbol/symbols. One or a plurality of virtually depicted controllers, in particular control dials or sliding controllers, are preferably pictured on the touchscreen at control settings that indicate the functional parameter(s). Within the scope of the invention, it is also conceivable that the virtually depicted controllers have a scale of values or are associated with said scale of values in order to indicate the degree of adjustment and/or control of the functional parameter(s).

In a possible configuration according to the invention, the symbol(s) can be selected by a contactless approach to the symbol(s) or by contact with the symbol(s). The user can, for example, select the symbol(s) with his/her first hand and assign the functional parameter(s) to the mechanical operating element for the purpose of adjustment, open-loop control and/or closed-loop control. The user can preferably set and/or control the degree of adjustment and/or control of the selected functional parameter(s) by actuating the mechanical operating element.

Provision is made in a further embodiment of the invention for the operating device to be designed to simultaneously and/or collectively assign a plurality of or all of the functional parameters to the mechanical operating element by means of the selection of a plurality of or all of the symbols. The user lays, for example, simultaneously two fingers of one hand onto two of the symbols in order to select the desired functional parameters and to collectively and/or simultaneously assign the same to the mechanical operating element. It is likewise conceivable within the scope of the invention that the user collectively and/or simultaneously selects three, four or five symbols and assigns the desired functional parameters. In so doing, the three, four or five functional parameters indicated by the symbols are collectively and/or simultaneously assigned to the mechanical operating element.

It is conceivable within the scope of the invention that the assignment of the control over the functional parameter(s) to the mechanical operating element is only active during the selection of the symbol(s) or simultaneously with the selection of said symbol(s). As an alternative or in addition thereto, it is also possible for the assignment of control over the functional parameter(s) to the mechanical operating element to be permanently activated after the selection of the symbol(s).

In a preferred embodiment according to the invention, the operating device is designed for a two-handed operation, a first hand of an operator operating the touchscreen and a second hand of the operator operating the mechanical operating element. The operator preferably selects the symbol(s) with the first hand and assigns the functional parameter(s) to the mechanical operating element. In particular the user operates the mechanical operating element with the second hand and thereby performs the setting, open-loop and/or closed-loop control of the assigned functional parameter(s).

Provision can be made in a possible embodiment of the invention for the touchscreen and the mechanical operating element to be arranged next to one another, in particular at the same relative height, on the operating device, in particular on the mixing console, in order to ensure a comfortable and ergonomic operation by the user. The touchscreen is therefore preferably on the side of the operating device on which the first hand of the operator is situated if said operator is located in front of the operating device, in particular of the mixing console. The touchscreen is, for example, disposed on the left side of the operating device, in particular the mixing console, and is designed to be operated by the left hand of the user. The mechanical operating element is particularly disposed on the right side of the operating device, in particular of the mixing console, for operation with the right hand of the user. A reversed arrangement of the touchscreen and the mechanical operating element on the operating device is also conceivable, wherein the mechanical operating element can be on the left side and the touchscreen on the right side. This arrangement can be particularly advantageous for left-handers.

In a further possible embodiment of the invention, the operating device is designed for the assignment of the functional parameter(s) on the touchscreen with the first hand and the setting, open-loop and or closed-loop control of the functional parameter(s) at the mechanical operating element with the second hand to be performed simultaneously. As explained earlier, the touchscreen is preferably designed to select one, two, a plurality of or all of the symbols by the approach thereto by the first hand of the user and/or by contact with the first hand of the user and to assign the control over the functional parameter(s) to the mechanical operating element. The mechanical operating element is particularly designed to set the functional parameters and to control said functional parameters in an open-loop manner and/or closed-loop manner during the assignment thereof by means of an operation by the user with the second hand.

In a preferred embodiment, the operating device is designed to initially perform the selection of the symbol(s) and the assignment of the functional parameter(s) on the touchscreen and subsequently to execute the setting of the functional parameter(s) with the mechanical operating element. In this type of operation, a simultaneous assignment and setting, open-loop and/or closed-loop control of the functional parameter(s) particularly does not occur.

Provision is made in a further possible embodiment according to the invention for the mechanical operating element to be designed as a mechanical controller, in particular as a control dial or a sliding controller, for setting the functional parameter(s) and for controlling said functional parameter(s) in an open-loop and or closed-loop manner. The control dial is preferably designed to increase the degree of adjustment and or the degree of control by turning it in a first direction and to decrease the same by turning it in a second direction opposite to said first direction. The sliding controller is particularly designed to increase the degree of adjustment and/or degree of control by being displaced in a first direction and to decrease the same by being displaced in a second direction opposite to said first direction.

A further subject matter of the invention relates to a mixing console for audio applications comprising the operating device. The mixing console is preferably designed to mix together audio signals to form a multichannel signal, in particular a stereo signal. The mixing console is particularly designed to be used for the acoustic irradiation of discotheques and concert halls. The mixing console is specifically designed for use in radio and/or television broadcasts and/or in film and/or recording studios.

The operating device is preferably designed for carrying out the following method.

Selection of one of, a plurality of or all of the symbols on the touchscreen and assignment of the functional parameter(s) to the mechanical operating element
  Setting, open-loop control and/or closed-loop control of the functional parameter(s) with the mechanical operating element The user initially selects, for example, the symbol(s) on the touchscreen and assigns the functional parameter(s) to the mechanical operating element, the selection and assignment preferably occurring by means of a single, momentary approach to and/or contact with the symbol(s). The user preferably selects the symbol(s) on the touchscreen by his/her first or second hand approaching or making contact with the symbol(s). In particular he/she removes his/her first or second hand from the touchscreen shortly thereafter, the selection and assignment of the functional parameter(s) remaining permanently active. The user does not have to specifically hold his/her hand or, respectively, his/her finger(s) over or on the symbol(s) during the setting, open-loop and/or closed-loop control of the functional parameter(s) but can set the functional parameter(s) and control the same in an open-loop and/or closed-loop manner even if he/she has already removed the first hand from the touchscreen. It is conceivable that the user uses only the first or only the second hand for selecting the symbol(s), for assigning and setting the functional parameter(s) and for controlling said functional parameters in an open-loop and/or closed-loop manner. The user preferably once again momentarily approaches the symbol(s) with the first or second hand or makes contact with the same if he/she has ended the setting, open-loop and/or closed-loop control of the functional parameter(s). Specifically the user deactivates the selection of the symbol(s) and the assignment of the control of the functional parameter(s) to the mechanical operating element by means of the renewed, momentary contact with and/or approach to the touchscreen.

It is particularly preferred for the user to approach the symbol(s) with his/her hand and/or to make contact with said symbol(s), whereby he/she assigns the control over the functional parameter(s) to the operating element when approaching or making contact with said symbol(s). The user preferably moves the first hand towards the symbol(s) and/or makes contact with the same, wherein he/she holds the first hand over or on the symbol(s) and meanwhile sets the functional parameter(s) and/or controls the same in an open-loop and/or closed loop manner with the second hand at the mechanical operating element. In particular he/she keeps his/her first hand on or over the symbol(s) as long as it takes for him/her to assign control over the functional parameter(s) to the mechanical operating element. The user preferably sets the functional parameter(s) and/or controls the same with his/her second hand at the mechanical operating element, while he/she selects the symbol(s) with his/her first hand. The user preferably removes his/her first hand from the selected symbol(s) only after completion of the setting, open-loop and/or closed-loop control of said functional parameter(s) and thereby concludes the assignment of the control over said functional parameter(s) to the mechanical operating element. Specifically the user only then moves his/her hand away from the touchscreen and deactivates the assignment of control over said functional parameter(s) to the mechanical operating element if he/she has set said functional parameter(s), controlled them in an open-loop manner and/or controlled them in a closed-loop manner. The user preferably operates the operating device with two hands, his/her first hand operating the touchscreen and his/her second hand the mechanical operating element. It is particularly preferred that the user collectively and/or simultaneously selects two or more symbols and collectively and/or simultaneously assigns two or more functional parameters to the mechanical operating element. In particular the user collectively and/or simultaneously sets and/or controls the two or more functional parameters with the operating element. The setting, open-loop control and/or closed-loop control of the degree of adjustment and/or degree of control of the functional parameters thereby occurs to the relative to the previous value.

BRIEF DESCRIPTION OF THE DRAWINGS

Further features, advantages and effects of the invention ensue from the following description of preferred exemplary embodiments of the invention as well from the associated figures. In the drawings.

DETAILED DESCRIPTION

Figure 1:
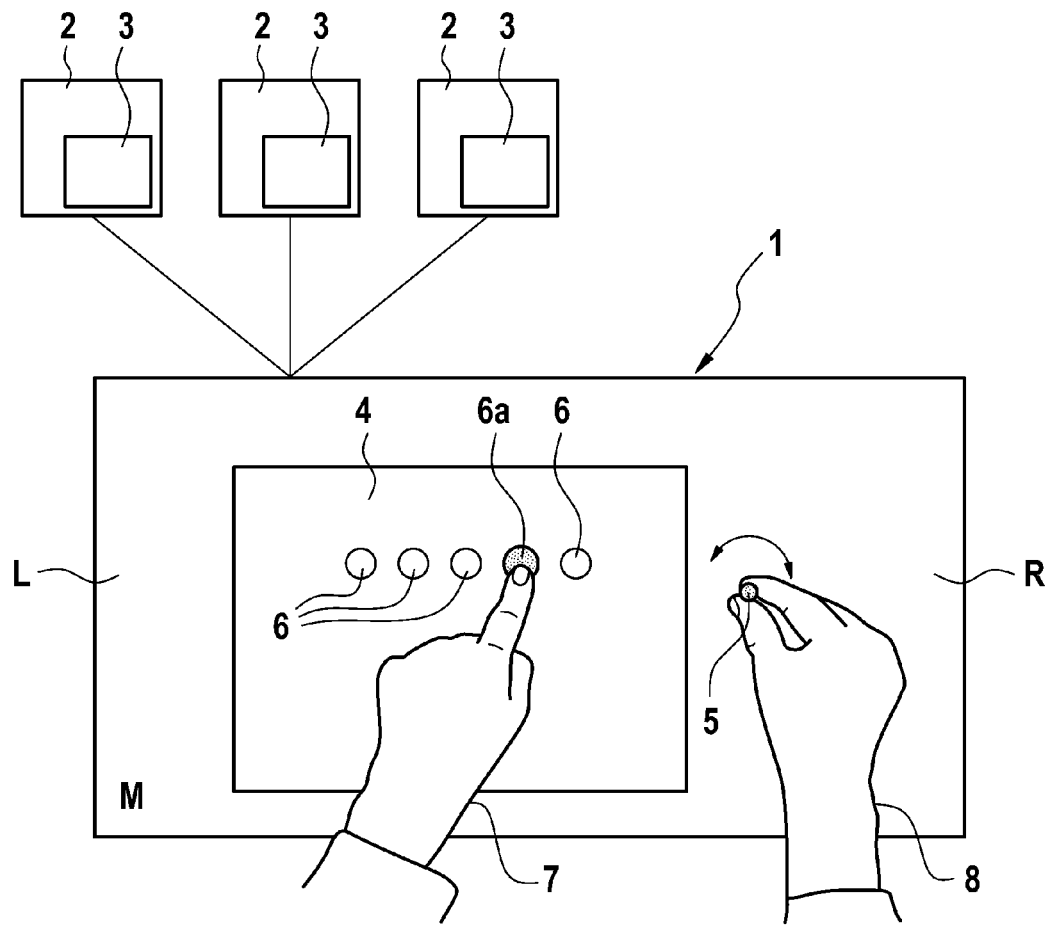
FIG. 1 shows a top view of an operating device.

The same parts or those corresponding to one another are in each case provided with the same reference numerals in the figures.

FIG. 1 shows a top view of an operating device 1 for operating three electric devices 2 as an exemplary embodiment of the invention. The operating device 1 is integrated into the mixing console M and is connected via electrical cables to the electric devices 2. The electric devices 2 are designed as audio signal sources 2, in particular as electric sound generators, musical instruments and/or microphones.

The audio signal sources 2 have five adjustable and/or controllable functional parameters 3. The functional parameters 3 comprise adjustable variables and/or values, such as volume, treble, bass, frequency response and dynamics of the audio signal sources 2.

The operating device 1 comprises a touchscreen 4 and a mechanical operating element 5. The touchscreen 4 and the mechanical operating element 5 are disposed next to one another on the operating device, in particular on the mixing console 1. In the top view, the touchscreen 4 is disposed on the left side L of the operating device 1 and the mechanical operating element 5 on the right side R of said operating device 1, in particular of said mixing console M.

The touchscreen 4 is designed as a touch-sensitive screen 4 and comprises a resistive sensor device. The touchscreen 4 is designed for the display of symbols, five symbols 6 being displayed in FIG. 1. The five symbols 6 symbolize the five functional parameters 3 of the audio signal sources 2.

The resistive sensor device is associated with the symbols 6, in particular disposed beneath the symbols 6 in an interior of the touchscreen 4. The mechanical operating element 5 is designed as a mechanical control dial 5. The left hand 7 of the user operates the touchscreen 4, the right hand 8 the control dial 5.

The operating device 1 is designed to operate the electric devices 2, in particular to tune and merge said devices with regard to the functional parameters 3.

The touchscreen 4, in particular the resistive sensor device, is designed to detect contact by the left hand 7 of the user. In so doing, the user momentarily places a finger of his/her hand, in FIG. 1 of the left hand 7, onto one of the symbols 6a and selects said symbol. After selecting said symbol 6a, the user can in turn remove his/her finger from the same, wherein the selection remains in effect.

With the selection of the symbol 6a, the user assigns the control dial 5 control over the functional parameter 3, which is symbolized by the symbol 6a, for adjustment, open-loop and/or closed loop control. The selected symbol 6a has a different color than the remaining, unselected symbols 6. In so doing, the assignment of the functional parameter 3 to the control dial 5 is displayed to the user.

If the user's finger is once again placed on the selected symbol 6a, said symbol is in turn deactivated and the assignment of the functional parameter 3 to the control dial 5 is concluded. After deactivation, the symbol 6a has again the color of the remaining symbols 6 in order to indicate the deactivation and conclusion of the assignment to the user.

The control dial 5 is designed to set the functional parameter 3 assigned to said control dial 5, control said parameter in an open-loop manner and/or control said parameter in a closed-loop manner. Because the user has his/her left hand again available for use after the selection of the symbol and the assignment of the functional parameter 3 to the control dial 5, he/she can optionally operate said control dial 5 with the left hand 7 or with the right hand 8. The operation of the control dial 5 is depicted in FIG. 1 with the use of the right hand 8.

By turning the control dial 5 clockwise, the user increases a degree of adjustment and/or degree of control of the functional parameter 3. By turning said control dial 5 counterclockwise, the user decreases the degree of adjustment and/or control of the functional parameter 3. By means of the mechanical clockwise or counterclockwise rotation of said control dial 5, the user obtains a haptic feedback, via which he/she can operate said control dial 5 without eye contact therewith and can precisely set the functional parameter 3 and/or control said functional parameter 3 in an open-loop and/or closed-loop manner.

The operating device 1 comprises an evaluation and control unit, the evaluator being designed to evaluate the contact detected by the sensor device and the counterclockwise or clockwise rotation of the control dial 5. The controller is designed to display the selection or deactivation of the symbol 6a by means of a color change and to control the assignment of the functional parameter 3 to the control dial 5. In addition, the controller is designed to control the functional parameter 3, in particular the degree of adjustment and degree of control thereof, in accordance with the counterclockwise or clockwise rotation performed at the control dial 5.

Figure 2:
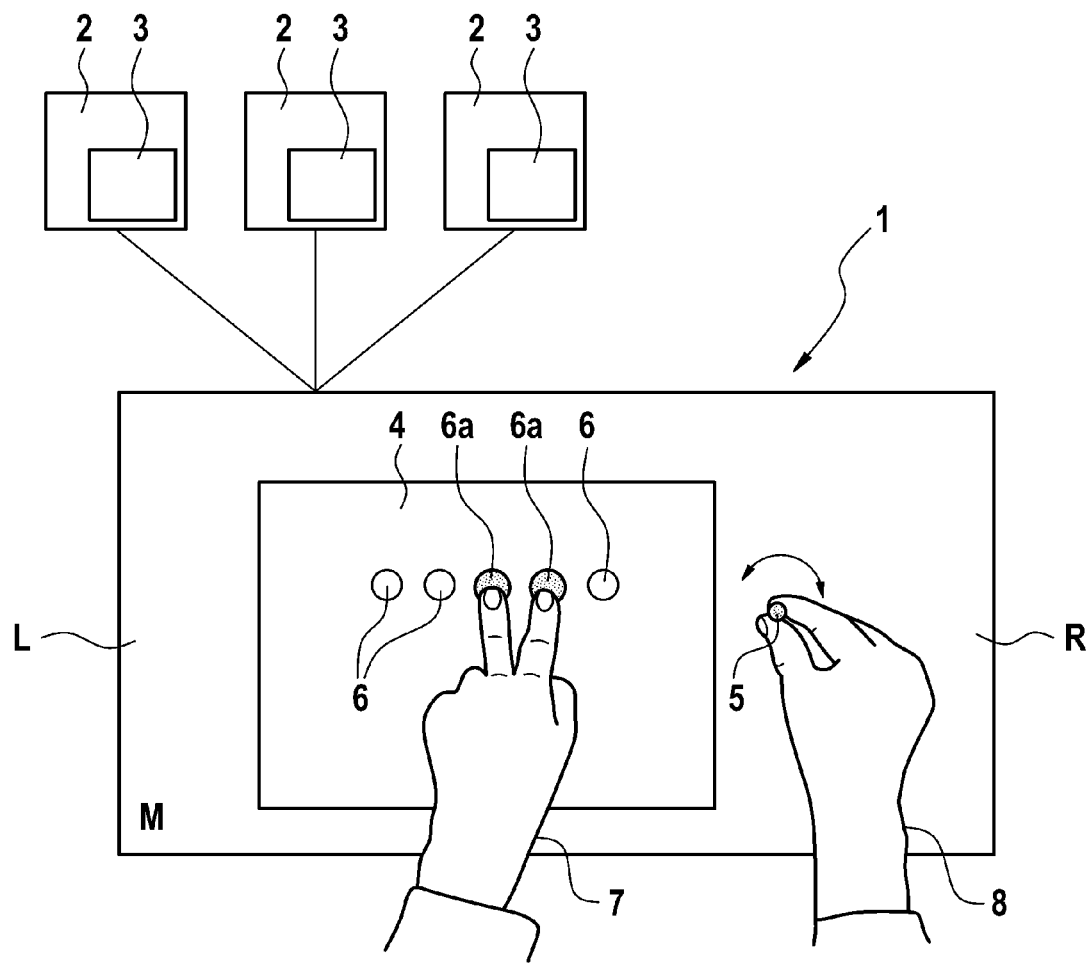
FIG. 2 shows a top view of an alternative to the operating device from FIG. 1.

FIG. 2 shows an alternative to the operating device from FIG. 1. The operating device 1 comprises the touchscreen 4 and the mechanical control dial 5. Said operating device 1 is designed for a two-handed operation by the user because a simultaneous and sustained contact with the symbols 6a is required for the selection of said symbols 6a and for the assignment of control over the functional parameter 3. The assignment of the control over the functional parameter 3 to the control dial 5 is only active as long as the fingers of the left hand 7 are in contact with the symbols 6a. If the user removes his/her fingers from the symbols 6a, the selection of the symbols 6a and the assignment of the functional parameters 3 to the control dial 5 are then concluded.

The user simultaneously places two fingers of his/her left hand 7 on the symbols 6a, which represent the functional parameters 3 to be set and/or controlled. By touching the symbols 6a, said symbols are selected. They thereby have a different color than the unselected symbols 6.

While contact is being made with the symbols 6a, the operating device 1 is designed to simultaneously assign the functional parameters 3 to the control dial 5. At the same time the user is selecting the symbols 6a with the left hand 7, he/she operates the control dial with the right hand 8 by turning it clockwise or counterclockwise and in so doing sets and/or controls the functional parameters 3 in an open-loop and/or closed-loop manner, in particular the degree of adjustment and degree of control of said functional parameters.

In an alternative exemplary embodiment, the touchscreen 4 and the control dial 5 are disposed laterally reversed to the disposal shown, wherein the control dial 5 is disposed on the left side L of the operating device 1, in particular of the mixing console M, and the touchscreen 4 on the right side R of said operating device 1, in particular of said mixing console M. The left hand 7 thus operates the control dial 5 and the right hand 8 the touchscreen 4. This disposal is particularly suited to a left-hander.

Figure 3:
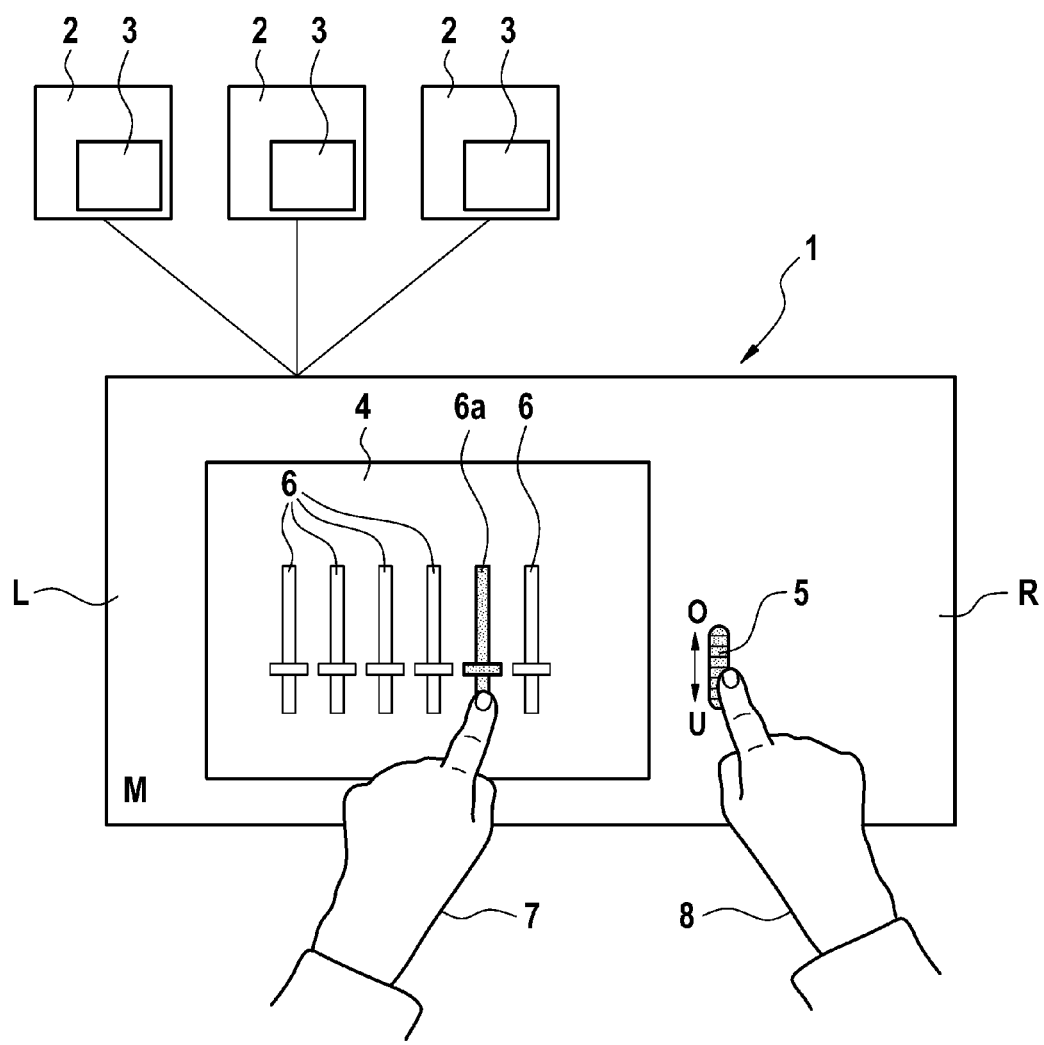
FIG. 3 shows a top view of a modification to the operating device from FIG. 1.

A modification to the operating device 1 from FIG. 1 is depicted in FIG. 3. The operating device 1 is designed to operate the three audio signal sources 2. The audio signal sources 2 have six functional parameters 3. The functional parameters 3 comprise adjustable values, such as the volume, treble, bass, dynamics, frequency response and a fader setting.

The touchscreen 4 is designed as an approach-sensitive screen, which can be operated by a contactless approach to the screen. The touchscreen 4 comprises a capacitive sensor device, which is designed to detect the contactless approach to said touchscreen 4.

Six symbols 6, which represent the six functional parameters 3 of the audio signal sources 2, are displayed on the touchscreen 4. The symbols 6 are designed as virtually depicted sliding controllers 6. They are designed to display the degree of adjustment and degree of control of the functional parameters 3 by means of a changing, virtual representation. When the degree of adjustment and control is increased or intensified, the virtually represented sliding controller 6a displaces upwards o. When the degree of adjustment and control is decreased, said virtually represented sliding controller displaces downwards u.

The mechanical operating element 5 is designed as a mechanical sliding controller 5. When the sliding controller 5 is displaced upwards o, the degree of adjustment and control of the functional parameter 3 is increased or intensified. When said sliding controller is downwardly displaced u, said degree of adjustment and control of the functional parameter 3 is decreased.

The user momentarily places a finger of the left hand 7 on the symbol 6a, which represents the functional parameter 3 to be set, and thereby selects the symbol 6a. The selected symbol 6a has a different light intensity than the remaining unselected symbols 6 in order to acknowledge the selection to the user.

The operating device 1 is designed to select and permanently activate the symbol 6a by means of the momentary, single contact and to assign the functional parameter 3 to the mechanical sliding controller 5. In order to actively maintain the selection of the symbol 6a and the assignment of the functional parameter 3, the user does not have to hold his/her finger over the symbol 6a but can in turn remove it therefrom. With one finger of the right hand 8, the user displaces the mechanical sliding controller 5 in accordance with the desired setting and/or control of the functional parameter 3. The mechanical sliding controller 5 is designed to mechanically and/or haptically feedback the displacement to the user.

When the user's finger once again momentarily approaches the symbol 6a, the selection of said symbol 6a and the assignment of the functional parameter 3 to the mechanical sliding controller 5 can in turn be concluded. In so doing, the light intensity of said previously selected symbol 6a is again equal to the light intensity of the remaining symbols 6a.

Figure 4:
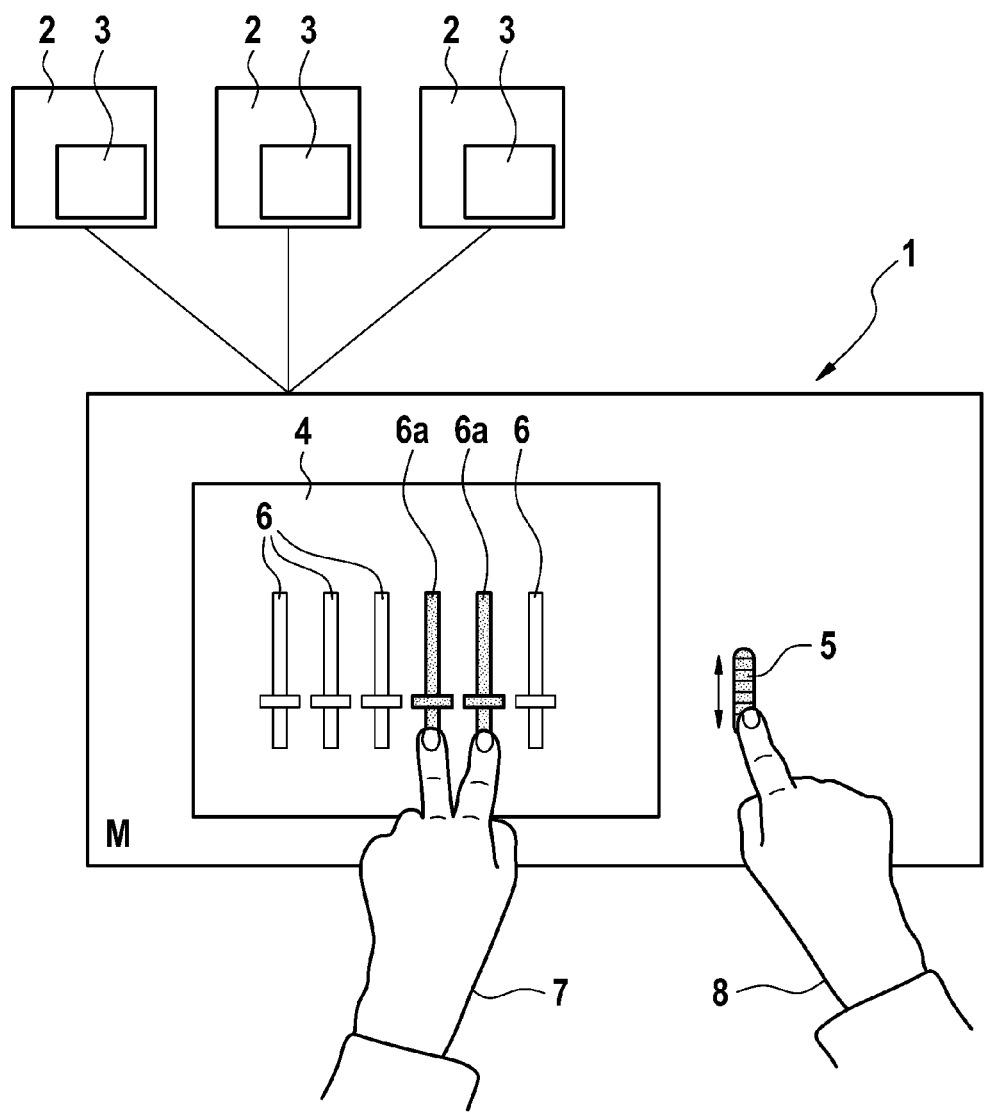
FIG. 4 shows a top view of an alternative to the operating device from FIG. 3.

FIG. 4 shows an alternative to the operating device from FIG. 3. The operating device 1 is designed for a two-handed operation by the user. The user simultaneously moves two fingers of his/her left hand 7 in a sustained manner towards the two symbols 6a, which represent the functional parameters 3 to be set and/or controlled. As long as the user holds the fingers over the symbols 6a, said symbols are selected and the desired functional parameters 3 are assigned to the mechanical sliding controller 5. The assignment of the control over the functional parameters 3 is in this case only active during the selection of the symbols 6a.

The sliding controller 5 is designed to collectively and simultaneously set and/or control the functional parameters 3 by its displacement upwards or downwards. The user operates the sliding controller 5 with his/her right hand, while he/she continuously holds the selection of the symbols 6a and the assignment of the functional parameters 3 on the touchscreen 4 with his/her left hand. As soon as the user removes his/her left hand 7 from the touchscreen 4, the selection of the symbols 6a and the assignment of the functional parameters 3 is concluded.

Figure 5:
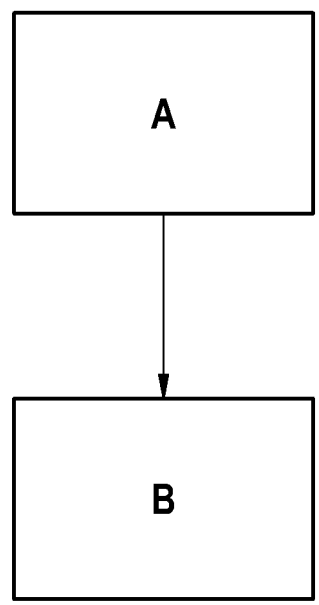
FIG. 5 shows a flow diagram for operating the operating device.

FIG. 5 shows a flow diagram for a method for operating the operating device 1. The method comprises the following steps:

One of, a plurality of or all of the symbols 6 are selected on the touchscreen 4 and one of, a plurality of or all of the functional parameters 3 are assigned (A) to the mechanical operating element 5. The user moves the left or right hand 7; 8 towards the functional parameters 3 represented by the symbol(s) and/or touches said symbol(s), whereby he/she assigns the functional parameter(s) 3 to the mechanical operating element 5.

The functional parameter(s) are set and/or controlled (B) with the mechanical operating element. The functional parameter(s) 3, in particular the degree of adjustment and/or control, is/are set and/or controlled by a rotational or sliding movement.

The invention claimed is:

1. An operating device for operating at least one electric device having a plurality of functional parameters, said operating device comprising a touchscreen and a mechanical operating element, wherein the touchscreen is configured to display a plurality of symbols each corresponding to a different one of the plurality of functional parameters, wherein the operating device is configured to assign at least two functional parameters of the plurality of the functional parameters to the mechanical operating element in response to receiving a simultaneous selection by physical contact of at least two symbols of the plurality of symbols displayed on the touchscreen, and wherein the operating device assigns control over the at least two functional parameters to the mechanical operating element only while physical contact is maintained by a user pressing the at least two symbols on the touchscreen such that adjustment of the mechanical operating element correspondingly adjusts the at least two functional parameters only while physical contact is maintained by the user on the at least two symbols on the touchscreen corresponding to the at least two functional parameters.

2. The operating device according to claim 1, wherein the operating device is designed for a two-handed operation, a first hand of an operator operating the touchscreen and a second hand of the operator operating the mechanical operating element while the physical contact is maintained with the at least two symbols of the plurality of symbols displayed on the touchscreen by the first hand.

3. The operating device according to claim 2, wherein the operating device is designed to perform the assignment of the at least two functional parameters on the touchscreen with the first hand and setting open-loop control or closed-loop control of the assigned at least two functional parameters at the mechanical operating element with the second hand.

4. The operating device according to claim 1, wherein the mechanical operating element includes a mechanical controller selected from a group consisting of a control dial and a sliding control.

5. The operating device according to claim 1, wherein the operating device is a mixing console for audio applications.

6. A method for operating at least one electric device having a plurality of functional parameters using an operating device, said operating device including a touchscreen and a mechanical operating element, the method comprising:
- displaying a plurality of symbols on the touchscreen each corresponding to a different one of the plurality of functional parameters, wherein the plurality of symbols includes a first symbol corresponding to a first functional parameter and a second symbol corresponding to a second functional parameter;
- receiving a selection by physical contact of both the first symbol and the second symbol on the touchscreen;
- assigning control of both the first functional parameter and the second functional parameter to the mechanical operating element while physical contact is maintained by a user with both the first symbol and the second symbol on the touchscreen; and
- adjusting the first functional parameter and the second functional parameter in response to an adjustment of the mechanical operating element while the physical contact is maintained by the user with both the first symbol and the second symbol on the touchscreen.

7. The method of claim 6, wherein the operating device initially performs the selection of the first symbol and the second symbol and the assignment of control of the first functional parameter and the second functional parameter in response to an input received on the touchscreen and subsequently executes the setting of open-loop control or closed-loop control of the first functional parameter and the second functional parameter in response to adjustment of the mechanical operating element.

8. An operating device for operating at least one electric device having a plurality of functional parameters, said operating device comprising:
- a touchscreen; and
- a mechanical operating element,
- wherein the operating device displays a plurality of symbols on the touchscreen, each symbol corresponding to a different one of the plurality of functional parameters, wherein the plurality of symbols includes a first symbol corresponding to a first functional parameter and a second symbol corresponding to a second functional parameter,
- wherein the operating device receives a selection of both the first symbol and the second symbol by a user making physical contact with both the first symbol and the second symbol on the touchscreen,
- wherein the operating device assigns control over both the first functional parameter and the second functional parameter to the mechanical operating element while the physical contact is maintained by the user with the first symbol and the second symbol on the touchscreen, and
- wherein an adjustment of the mechanical operating element correspondingly adjusts the first functional parameter and the second functional parameter while the user maintains the physical contact with the first symbol and the second symbol on the touchscreen.

\* \* \* \* \*